United States Patent [19]

Ichikawa

[11] Patent Number: 4,597,157
[45] Date of Patent: Jul. 1, 1986

[54] WIRE BEAD FORMING APPARATUS
[75] Inventor: Seizo Ichikawa, Higashimurayama, Japan
[73] Assignee: Bridgestone Tire Company Limited, Tokyo, Japan
[21] Appl. No.: 587,023
[22] Filed: Mar. 6, 1984
[30] Foreign Application Priority Data Apr. 6, 1983 [JP] Japan .................................. 58-60613

[51] Int. Cl.⁴ .............................................. B29D 30/48
[52] U.S. Cl. ..................................... 29/564.8; 140/88; 156/422
[58] Field of Search ................... 29/33 F, 564.6, 564.8; 140/88; 245/1.5; 156/422

[56] References Cited
U.S. PATENT DOCUMENTS 2,083,350  6/1937  Shook ................................... 156/422
3,330,491  7/1967  Williams .............................. 140/88
3,475,255  10/1969  Lang et al. ........................... 156/422

FOREIGN PATENT DOCUMENTS 57-26943  6/1982  Japan .

Primary Examiner—Eugene F. Desmond
Attorney, Agent, or Firm—Cushman, Darby & Cushman

[57] ABSTRACT

A bead forming apparatus, comprising stationary and movable support members; a collapsible bead forming drum rotatable about an axis fixed with respect to the stationary support member; feed rollers mounted on the movable support member to drive the bead forming element toward the bead forming drum along a predetermined path, the rollers being rotatable about axes parallel with the axis of rotation of the bead forming drum and including a main feed roller, a first auxiliary feed roller to impart a coiling tendency to the bead forming element to be passed from the main feed roller toward the bead forming drum, and a second auxiliary feed roller to guide the bead forming element to travel past the first auxiliary feed roller toward the bead forming drum; cutting blades for cutting the bead forming element at a predetermined location on the aforesaid path; an aperture for retaining the leading end of the bead forming element extending from the second auxiliary feed roller at the aforesaid predetermined location; and a retaining element for retaining the leading end of a cut segment of the bead forming element on the peripheral surface of the bead forming drum.

11 Claims, 5 Drawing Figures

WIRE BEAD FORMING APPARATUS

FIELD OF THE INVENTION

The present invention relates to a bead forming apparatus for forming a wire bead to form part of a pneumatic tire and, more particularly, to a bead forming apparatus including a radially collapsible bead forming drum on which a bead forming element is to be wound a suitable number of turns to form a looped wire bead to form part of a pneumatic tire. The bead forming element consists of, for example, a plurality of wires wrapped in or covered with rubber.

BACKGROUND OF THE INVENTION

An example of prior-art bead forming apparatus of the type above specified is disclosed in Japanese Patent Publication No. 57-26943. The bead forming apparatus therein taught is constructed to have a bead forming element wound on a tire ply preliminarily wrapped round a drum adapted to form a green tire. The drum is formed with circumferential grooves adjacent the opposite axial ends of the drum and with recesses respectively crossing the grooves. Each of the recesses is open in the peripheral and end walls of the drum and is deeper than the circumferential grooves. Means are provided to feed bead forming elements in such a manner that each of the bead forming elements has its leading end located in each of the recesses through the tire ply wrapped round the drum. Each bead forming element is retained at its leading end in each of the recesses by retaining means rotatable with the drum. The drum is then driven for rotation to have the bead forming elements wound on the tire ply. After a predetermined length of bead forming element is wound on the drum adjacent each axial end of the drum, the bead forming element is liberated from the recess and has its trailing end retained to the resultant wire bead in the vicinity of the initial leading end of the bead forming element.

In order to feed a bead forming element to the drum in a prior-art bead forming apparatus of this type, suitable pinch-off means is provided to have the bead forming element gripped at its leading end. The pinch-off means is driven to move toward the drum together with the bead forming element thereby gripped. The provision of such pinch-off means results in intricate construction of the bead forming apparatus as a whole. A problem further arises from the use of the pinch-off means in that the bead forming element tends to be contaminated with the lubricant which must be applied to the pinch-off means.

After a tire bead is formed on the drum, the bead forming element is cut from the tire bead by suitable cutting means. The cutting means and the means to drive the retaining means provided in the above described prior-art bead forming apparatus are located at considerable distances from the drum, this resulting in large-sized overall construction of the apparatus. The prior-art bead forming apparatus is further required to use means such as an adhesive tape or an adhesive compound to have the trailing end portion of the bead assuredly retained to the body of the bead so as to prevent the trailing portion from recoiling.

A prime object of the present invention is to provide an improved bead forming apparatus which is free from these problems which have thus far been inherent in a prior-art bead forming apparatus of the described nature.

SUMMARY OF THE INVENTION

In accordance with the present invention, there is provided a bead forming apparatus for forming a looped wire bead from a continuous line of bead forming element, comprising support means including a stationary support member; a generally cylindrical, variable-diameter bead forming drum rotatable about an axis fixed with respect to the stationary support member; transfer means operative to drive the bead forming element toward the bead forming drum along a predetermined path and to impart a coiling tendency to the bead forming element to be passed from the transfer means toward the bead forming drum; cutting means for cutting the bead forming element at a predetermined location on the aforesaid path; first retaining means for retaining the leading end of the bead forming element extending from the transfer means at aforesaid predetermined location; and second retaining means for retaining the leading end of a cut segment of the bead forming element on the peripheral surface of the bead forming drum.

In a bead forming apparatus thus constructed and arranged the transfer means may comprise a main feed roller rotatable about an axis parallel with the axis of rotation of the bead forming drum and at least one auxiliary feed roller which is rotatable about an axis parallel with the axis of rotation of the bead forming drum and which is located posterior to the main feed roller and anterior to the bead forming drum, the auxiliary feed roller being adapted to impart a coiling tendency to the bead forming element to be passed from the main feed roller toward the bead forming drum. In this instance, the support means may further comprise a movable support member which is movable with respect to the stationary support member, the main feed roller and the auxiliary feed roller being rotatably mounted on the movable support member so that the predetermined path of the bead forming element is variable with respect to the bead forming drum.

Alternatively, the transfer means in a bead forming apparatus according to the present invention may comprise a main feed roller rotatable about an axis parallel with the axis of rotation of the bead forming drum, a first auxiliary feed roller which is rotatable about an axis parallel with the axis of rotation of the bead forming drum and which is located posterior to the main feed roller and anterior to the bead forming drum, the auxiliary feed roller being adapted to impart a coiling tendency to the bead forming element to be passed from the main feed roller toward the bead forming drum, and a second auxiliary feed roller which is rotatable about an axis parallel with the axis of rotation of the bead forming drum and which is located posterior to the first auxiliary feed roller and anterior to the bead forming drum, the second auxiliary feed roller being adapted to guide the bead forming element to travel toward the bead forming drum. In this instance, the support means may also further comprise a movable support member which is movable with respect to the stationary support member, the main feed roller and the first and second auxiliary feed rollers being rotatably mounted on the movable support member so that the predetermined path of the bead forming element is variable with respect to the bead forming drum.

BRIEF DESCRIPTION OF THE DRAWINGS

The features and advantages of a bead forming apparatus according to the present invention will be more clearly appreciated from the following description taken in conjunction with the accompanying drawings in which.

DESCRIPTION OF THE PREFERRED EMBODIMENT

Figure 1:
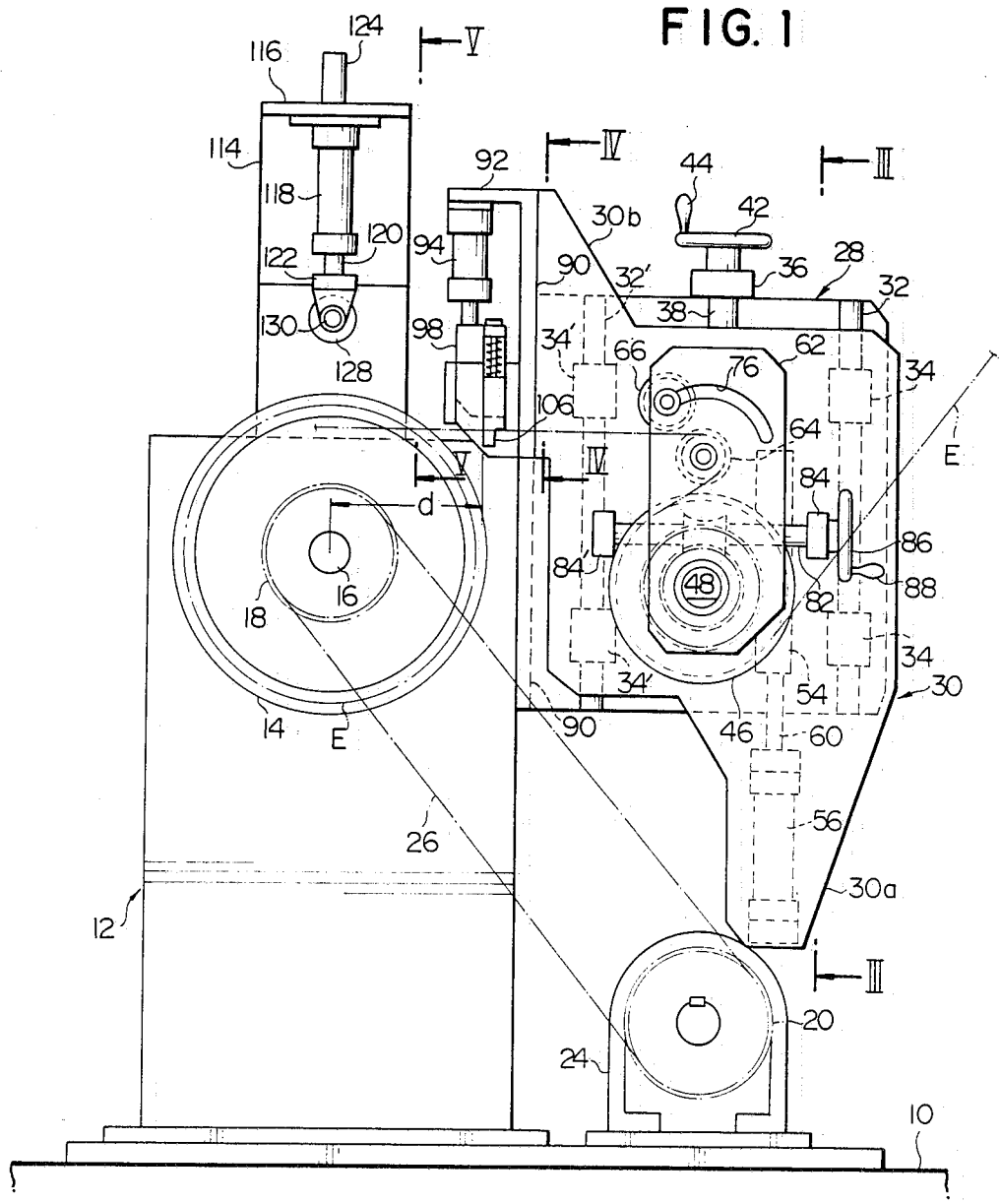
FIG. 1 is a front elevation view showing a preferred embodiment of a bead forming apparatus according to the present invention.
Figure 2:
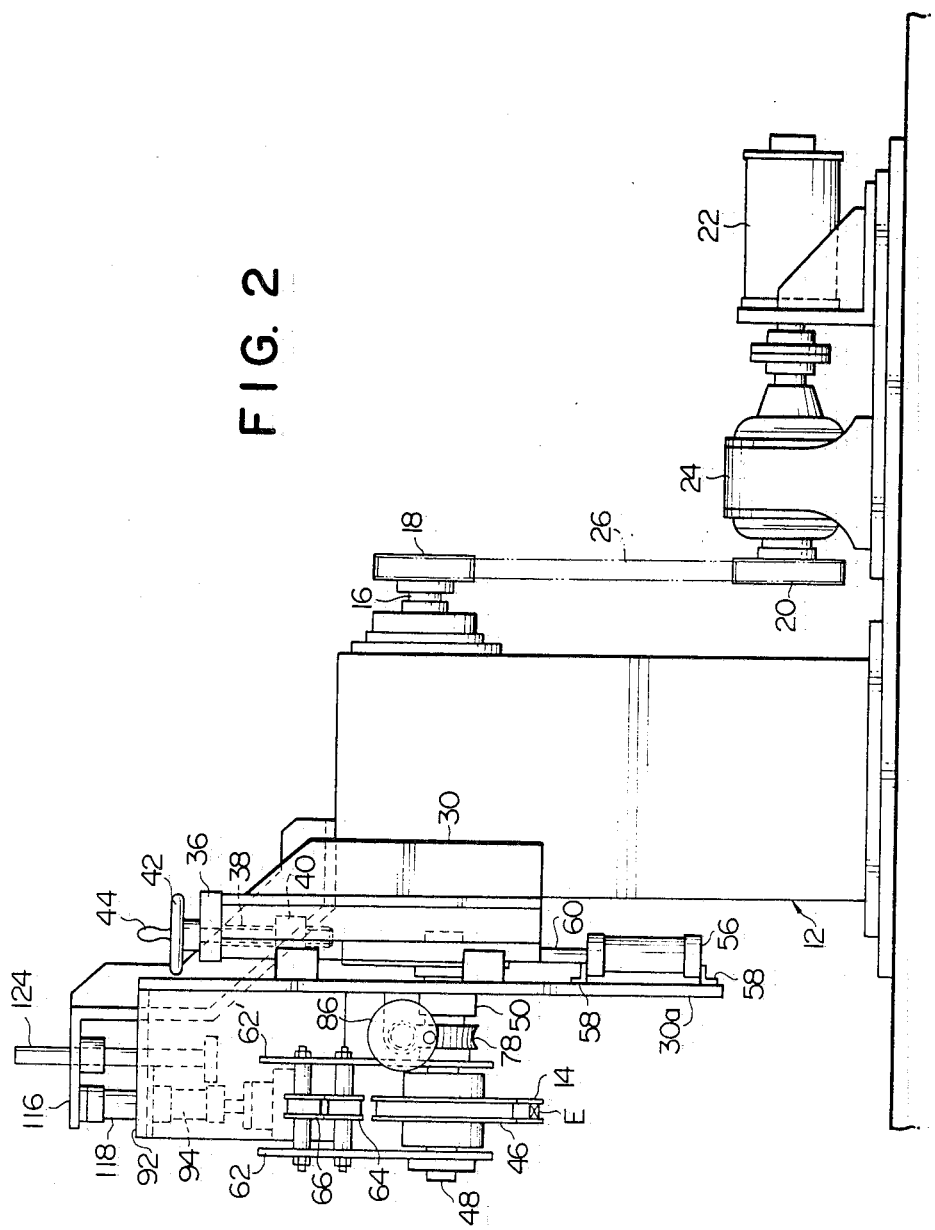
FIG. 2 is a side elevation view of the bead forming apparatus shown in FIG. 1.

Referring to the drawings, first particularly to FIGS. 1 and 2 thereof, a bead forming apparatus embodying the present invention is shown installed on a floor surface 10 and comprises a generally box-shaped frame structure 12 upstanding from the floor surface 12. The frame structure 12 has supported thereon a generally cylindrical, variable-diameter bead forming drum 14 coaxially mounted on a horizontal drum shaft 16 journaled in suitable bearing means in the frame structure 12 and axially extending forwardly from, for example, the front wall of the frame structure 12. The drum shaft 16 is rotatable about the horizontal center axis thereof and projects outwardly from the rear wall of the frame structure 12 for connection to or engagement with suitable drive means adapted to drive the shaft 16 and accordingly the bead forming drum 14 for rotation about the center axis of the shaft 16. In the embodiment herein shown, such drive means comprises a driven pulley 18 coaxially and securely mounted on a rear end portion of the drum shaft 16, a driving pulley 20 operatively coupled to the output shaft of a d.c. motor 22 through a reduction gear unit 24, and an endless belt 26 passed between the driven and driving pulleys 18 and 20. The motor 22 and the reduction gear unit 24 are installed on the floor surface 10. Though not shown, the bead forming drum 14 per se is composed of a plurality of elementary drum segments which are disposed around the center axis of the drum 14 and which are discrete from one another circumferentially of the drum 14. As well known in the art, the individual drum segments are radially movable toward and away from the center axis of the bead forming drum 14, which is accordingly radially collapsible and expansible in its entirety. The bead forming drum 14 thus constructed is adapted to have wound thereon a bead forming element E supplied from an external source or supply reel (not shown). The bead forming element E to be processed in the bead forming apparatus embodying the present invention is assumed to be composed of several wires arranged in the form of a strip or band and wrapped in or coated with rubber.

Figure 3:
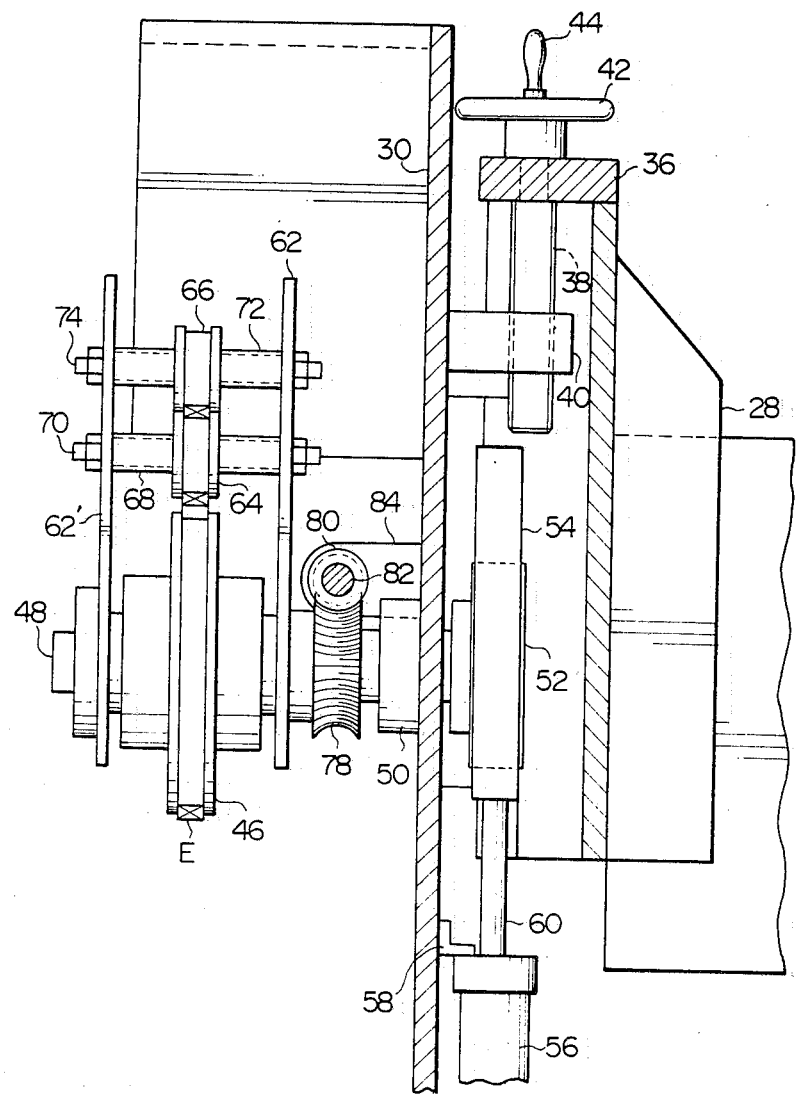
FIG. 3 is a sectional view showing the apparatus of FIGS. 1 and 2 as viewed from a vertical plane indicated by line III—III in FIG. 1.

The frame structure 12 forms part of support means of a bead forming apparatus according to the present invention and the support means further comprises a main stationary support member 28 sidewise projecting from one of the side walls of the frame structure and an auxiliary movable support member 30 which is supported by the main stationary support member 28. The auxiliary movable support member 30 is movable upwardly and downwardly on and with respect to the support member 28 and has upper and lower extensions 30a and 30b. One of the stationary and movable support members 28 and 30 such as the stationary support member 28 as shown has fixedly attached to its face confronting the movable support member 30 a pair of vertically elongated guide rails 32 and 32' which are spaced in parallel from each other as indicated by broken lines in FIG. 1. In association with these guide rails 32 and 32' on the stationary support member 28 are provided a pair of vertically spaced slide members 34 slidable on one guide rail 32 and a pair of vertically spaced slide members 34' slidable on the other guide rail 32' as also indicated by broken lines in FIG. 1. The slide members 34 and 34' are securely attached to the rear face of the other of the support members 28 and 30, viz., the movable support member 34 in the shown arrangement. The stationary support member 28 has further mounted thereon an apertured member 36 through which a vertical threaded rod 38 extends downwardly as indicated by broken lines in FIG. 2. The threaded rod 38 is rotatable about the center axis thereof with respect to the stationary support member 28 and has its threaded stem portion engaged by an internally threaded member 40 securely attached to the movable support member 30 as will be better seen in FIG. 3 of the drawings. The rod 38 is connected at its upper end to a wheel or disc 42 carrying a handle 44 and can thus be manually driven for rotation about the center axis thereof by turning the wheel or disc 42 at the handle 44. As the wheel or disc 42 is driven for rotation in either direction, the threaded rod 38 is caused to turn about the center axis thereof and causes the movable support member 30 to move upwardly or downwardly with respect to the stationary support member 28. The threaded rod 38 is assumed by way of example as extending between the support members 28 and 30 and between the guide rails 32 and 32' and the internally threaded member 40 is assumed as being mounted on the rear face of the movable support member 30. If desired, the rod 38 may be mounted on the movable support member 30 and the internally threaded member 40 mounted on the stationary support member 28. The threaded rod 38 and the internally threaded member 40 constitute means to adjust the vertical position of the movable support member 28 with respect to the stationary support member 30 in the embodiment herein shown.

A bead forming apparatus according to the present invention further comprises transfer means adapted to transfer a supplied bead forming element E toward the bead forming drum 14 described previously. In the embodiment herein shown, the transfer means comprises a main feed roller 46 securely mounted on a drive shaft 48 having an axial portion journaled in a bearing member 50 securely attached to the movable support member 30. The drive shaft 48 is thus rotatable with respect to the movable support member 30 about an axis parallel with the axis of rotation of the bead forming drum 14. Though not shown in the drawings, the main feed roller 46 is mounted on the drive shaft 48 by means of a suitable one-way clutch adapted to prohibit the roller 46 from turning in a direction opposite to the direction in which the drum 46 is to be turned to feed the bead forming element E toward the bead forming drum 14. The direction of rotation of the feed roller 46 to feed the bead forming element E toward the bead forming drum 14 is indicated by arrow a in FIG. 1. The feed roller 46 has an axial length equal to that of the bead forming drum 14 and has the center point of the center axis located on a vertical plane on which the center point of the center axis of the bead forming drum 14 is located. The drive shaft 48 carrying such a feed roller 46 axially projects rearwardly through the movable support member 30 for connection to or engagement with suitable drive means adapted to drive the shaft 48 and accordingly the feed roller 46 for rotation about the center axis of the shaft 48. In the embodiment herein shown, such drive means comprises a pinion gear 52 securely carried on a rear end portion of the shaft 48 and a vertically elongated rack member 54 which is in constant mesh with the pinion gear 52 as will be best seen in FIG. 3. The rack member 54 is driven for reciprocating movement with respect to the movable support member 30 by, for example, a pneumatic power cylinder 56 supported on the support member 30. The pneumatic power cylinder 56 extends vertically and includes a cylinder body secured to the rear face of the lower extension 30a of the support member 30 by means of a bracket member 58 and a piston rod 60 axially extending upwardly from the cylinder body and securely connected at its upper end to the rack member 54. When the piston rod 60 of the power cylinder 56 is driven or otherwise caused to move in a direction to retract into the cylinder body, the rack member 54 is caused to move downwardly with respect to the movable support member 30. The downward movement of the rack member 54 is converted into rotation of the pinion gear 52 and drives the drive shaft 48 for rotation in a direction to transmit a driving torque to the feed roller 46 through the one-way clutch. The feed roller 46 is thus enabled to turn in the direction of arrow a through an angle determined by the distance of movement of the piston rod 60. When the piston rod 60 is driven to move in a direction to project from the cylinder body, the rack member 54 is caused to move upwardly with respect to the movable support member 30 and drives the drive shaft 48 for rotation in a direction opposite to the direction of arrow a. The drive shaft 48 thus simply runs idle on the one-way clutch so that the feed roller 46 is enabled to remain at a standstill.

The drive shaft 48 of the main feed roller 46 has further carried thereon a pair of support plates 62 and 62' which are spaced apart in parallel from each other on both sides of the feed roller 46. The support plates 62 and 62' are pivotally mounted on the driven shaft 48 and are thus rotatable together about the center axis of the shaft 48. The support plates 62 and 62' form part of the above mentioned transfer means and have first and second auxiliary feed rollers 64 and 66 carried thereon. The first auxiliary feed roller 64 serves as a coiling roller adapted to impart a curling or coiling tendency to the bead forming element E and is coaxially mounted on a sleeve 68 which is rotatably received on a shaft 70. The shaft 70 is secured at its opposite ends to the support plates 62 and 62' by means of suitable fastening elements such as nuts. The diameter of the first auxiliary feed roller 64 is selected so that the bead forming element E passed through the feed roller 64 is given a tendency to curl or coil with a radius of curvature approximately equal or otherwise related to the radius of the bead forming drum 14. On the other hand, the second auxiliary feed roller 66 serves as a guide roller and further as means to adjust the coiling tendency of the bead forming element E passed through the first auxiliary feed roller 64. Similarly to the first auxiliary feed roller 64, the second auxiliary feed roller 66 is coaxially mounted on a sleeve 72 rotatably received on a shaft 74. Unlike the shaft 70 carrying the first auxiliary feed roller 64, the shaft 74 carrying the second auxiliary feed roller 66 has its opposite end portions slidably received in arcuate or otherwise suitably curved slots 76 respectively formed in the support plates 62 and 62' as shown in FIG. 1. Preferably, the slots 76 are arcuately curved about the center axis of the shaft 70 carrying the first auxiliary feed roller 64 as shown. The shaft 74 is disengageably retained to the support plates 62 and 62' by nuts or other suitable releasable retaining elements. The location of the second auxiliary feed roller 66 with respect to the first auxiliary feed roller 64 can thus be varied arbitrarily by selecting the location of the feed roller 66 in the slots 76. Each of the shafts 70 and 74 thus carrying the auxiliary feed rollers 64 and 66, respectively, has a center axis parallel with the axis of rotation of the drive shaft 48 of the main feed roller 46. Furthermore, each of the first and second auxiliary feed rollers 64 and 66 also has an axial length equal to that of the drum 14 and has the center point of its center axis located on the previously mentioned vertical plane on which the center point of the center axis of the bead forming drum 14 is located. One of the support plates such as the support plate 62 has formed or fixedly mounted thereon a first gear member constituted by a worm gear 78 coaxial to the drive shaft 48 carrying the main feed roller 46. The worm gear 78 is in constant mesh with a second gear member constituted by a worm 80 formed or securely mounted on a shaft 82 having opposite axial end portions journaled in bearing members 84 and 84' fixedly attached to the front face of the movable support member 30 as shown in FIG. 1. The shaft 82 has its axis of rotation directed perpendicularly in non-intersecting relationship to the axis of rotation of the drive shaft 48 of the main support member 46. One axial end of the shaft 82 projects outwardly from the bearing member 84 and is connected at its end to a wheel or disc 86 carrying a handle 88. The shaft 82 and accordingly the worm 80 thereon can thus be manually driven for rotation about the center axis of the shaft 82 by turning the wheel or disc 86 at the handle 88. As the wheel 42 is driven for rotation in either direction, the worm 80 is caused to turn about the center axis of the shaft 82 and causes the worm gear 78 to turn on the drive shaft 48 about the center axis of the shaft 48. This in turn causes the support plates 62 and 62' to turn in either direction about the axis of rotation of the feed roller with respect to the movable support member 30. The locations of the first and second auxiliary feed rollers 64 and 66 with respect to the main feed roller 46 can thus be varied by manually turning the wheel or disc 86 at the handle 88. The first and second auxiliary feed rollers 64 and 66 are located at levels higher than the main feed roller 46 so that the bead forming element E passed through the first auxiliary feed roller 64 travels along a horizontal path toward the upper end of the bead forming drum 14 as will be seen from FIG. 1.

Figure 4:
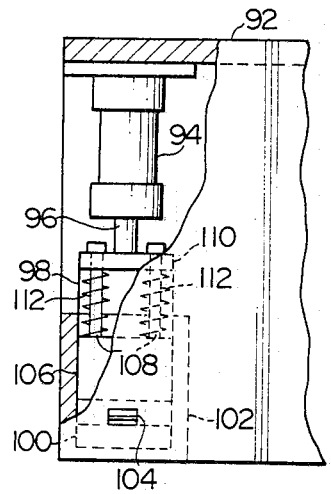
FIG. 4 is a sectional view showing the apparatus of FIGS. 1 and 2 as viewed from vertical planes indicated by lines IV—IV in FIG. 1.

The bead forming apparatus embodying the present invention further comprises cutting means adapted to cut the bead forming element E to be transferred to the bead forming drum 14 from the above mentioned second auxiliary feed roller 66 of the transfer means. The cutting means is located in the neighborhood of the bead forming drum 14 and the upper extension 30b of the movable support member 30 and comprises a vertically elongated support plate 90 secured to the extension 30b and having at its upper end a sidewise projecting ledge or bracket portion 92 located above the path of the bead forming element E between the second auxiliary feed roller 66 and the bead forming drum 14. A fluid-operated power cylinder 94 extends vertically and has a cylinder body securely connected at its upper end to this ledge or bracket portion 92 of the support plate 90 and a piston rod 96 axially extending downwardly from the cylinder body as will be seen from FIG. 4 of the drawings. The piston rod 96 of the power cylinder 94 is directed toward and in alignment with the above mentioned path of the bead forming element E between the second auxiliary feed roller 66 and the bead forming drum 14 and has a first or upper cutting blade 98 securely attached to the piston rod 96 at the lower end of the rod and having a downwardly directed knife edge. The upper cutting blade 98 thus vertically movable with respect to the movable support member 30 cooperates with a second or lower cutting blade 100 fixedly positioned at the bottom of an upwardly open, hollow receptacle 102 securely attached to the support plate 90. The cutting blade 100 has an upwardly directed knife edge which is at least in part flush with the horizontal path of the bead forming element E between the second auxiliary feed roller 66 and the bead forming drum 14. The upper and lower cutting blades 98 and 100 are substantially aligned in vertical direction with each other across the horizontal path of the bead forming element E between the feed roller 66 and the bead forming drum 14. The power cylinder 94 as the drive means for the upper cutting blade 98 is adapted to drive the cutting blade 98 downwardly into and upwardly out of a predetermined position to engage the lower cutting blade 100. When the upper cutting blade 98 is thus driven to move downwardly into such a vertical position by the power cylinder 94, the bead forming element E extending along the path is cut between the blades 98 and 100. The cutting means thus arranged is associated with first retaining means which is located in the neighborhood of the bead forming drum 14 and which is adapted to retain the bead forming element E on the path between the feed roller 66 and the bead forming drum 14 at the leading end of the bead forming element E extending from the feed roller 66. In the embodiment herein shown, the first retaining means comprises a wall portion of the support plate 90 formed with a preferably rectangular aperture 104 (FIG. 4) which is located on the path of the bead forming element E between the feed roller 66 and the bead forming drum 14. The cutting means is preferably further associated with first pressing means which is also located in the neighborhood of the bead forming drum 14 and which is adapted to downwardly press the bead forming element E against the lower cutting blade 100 at the leading end of the bead forming element E leading from the aperture 104 toward the feed roller 66. The first pressing means comprises a pressing member 106 located above the lower cutting blade 100 and a pair of spaced, parallel vertical guide rods 108 projecting upwardly from the pressing member 106. The guide rods 108 are vertically slidable through openings formed in a bracket member 110 secured to the piston rod 96 of the above described fluid-operated power cylinder 94 as shown in FIG. 4. The pressing member 106 is thus vertically movable with the upper cutting blade 98 toward and away from a position to engage the lower cutting blade 100 and is urged to move downwardly toward the lower cutting blade 100 by suitable biasing means. In the arrangement shown in FIG. 4, the biasing means is assumed to comprise a pair of helical compression springs surrounding the guide rods 108 and each seated at one end on the pressing member 106 and at the other on the bracket member 110. As the piston rod 96 of the power cylinder 94 is driven to move downwardly with respect to the support plate 90, the pressing member 106 is caused to move downwardly together with the upper cutting blade 98 until the cutting blade 98 and the pressing member 106 are brought into contact with the bead forming element E at its lower end. After the pressing member 106 is thus brought into contact with the bead forming element E, the compression springs 112 are caused to axially contract and thereby cause the pressing member 106 to elastically press the bead forming element E against the lower cutting blade 100 engaged by the upper cutting blade 98. The cutting, retaining and pressing means which are constructed and arranged as above described are preferably located with respect to the bead forming drum 14 such that the horizontal distance (represented by d in FIG. 1) between the vertical plane containing the axis of rotation of the bead forming drum 14 and the vertical at which the bead forming element E is to be cut on the path of the bead forming element E between the feed roller 66 and the bead forming drum 14 measures about 160 mm or more generally less than about 200 mm.

The bead forming apparatus embodying the present invention further comprises second retaining means provided in association with the bead forming drum 14 and adapted to retain a cut segment of the bead forming element E onto the peripheral surface of the bead forming drum 14 at the leading end of the segment. Though not shown in the drawings, the second retaining means may comprise, by way of example, a retaining element included in a bead forming apparatus disclosed the previously mentioned Japanese Patent Specification No. 57-26943. The bead forming apparatus embodying the present invention further comprises second pressing means also provided in association with the bead forming drum 14 and adapted to press the bead forming element E against the peripheral surface of the bead forming drum 14. As will be seen from FIG. 1 and more clearly in FIG. 5 of the drawings, the second pressing means comprises a vertically elongated support plate 114 upstanding from the frame structure 12 and having at its upper end a sidewise projecting ledge or bracket portion 116 located above the bead forming drum 14. A fluid-operated power cylinder 118 extends vertically and has a cylinder body securely connected at its upper end to this ledge or bracket portion 116 of the support plate 114 and a piston rod 120 axially extending downwardly from the cylinder body. The piston rod 120 of the power cylinder 118 is directed toward and in alignment with the shaft 16 of the bead forming drum 14 and has a roller carrier 122 securely attached thereto at the lower end of the rod. The roller carrier 122 in turn is securely connected to a guide rod 124 extending in parallel with the power cylinder 118 and slidable vertically through an opening formed in a guide block 126 attached to the ledge or bracket portion 116 of the support plate 114. The roller carrier 122 has further carried at its lower end a pressing roller 128 which is rotatable on a shaft 130 secured to the carrier 122 and extending in parallel with the shaft 16 of the bead forming drum 14. The pressing roller 128 is thus rotatable about an axis parallel with the axis of rotation of the bead forming drum 14 and is vertically movable downwardly toward and upwardly away from the bead forming drum 14.

Description will be hereinafter made regarding the mode of operation of the bead forming apparatus thus constructed and arranged.

Prior to the first cycle of operation, the bead forming drum 14 may be expanded or contracted to a diameter to comply with the diameter of the wire beads to be produced. Depending upon the diameter thus adjusted of the bead forming drum 14, the locations of the first and second auxiliary feed rollers 64 and 66 with respect to the main feed roller 46 may also be adjusted by manually turning the wheel or disc 86 at the handle 88 (FIGS. 1 and 2). If desired, the location of the second auxiliary feed roller 66 may be further varied with respect to the first auxiliary feed roller 64 by manually moving the feed roller 66 through the slots 76 in the support plates 62 and 62'. The vertical positions of the main feed roller 46 and the auxiliary feed rollers 64 and 66 with respect to the stationary support member 28 may also adjusted depending upon the diameter of the bead forming drum 14 by manually turning the wheel or disc 42 at the handle 44 (Figs. 1 and 2). The bead forming element E to be processed extends from the supply source and is wound partially on the main feed roller 46 and partially on the first auxiliary feed roller 64 as shown in FIG. 1. From the first auxiliary feed roller 64, the bead forming element E horizontally extends past the second auxiliary feed roller 66 and through the aperture 104 (FIG. 4) in the support plate 90. The leading end portion of the bead forming element E thus passed through the aperture 104 is cut by the upper and lower cutting blades 98 and 100 so that the bead forming element E extending through the aperture 104 in the support plate 90 has its leading end located on the lower cutting blade 100 of the cutting means.

Figure 5:
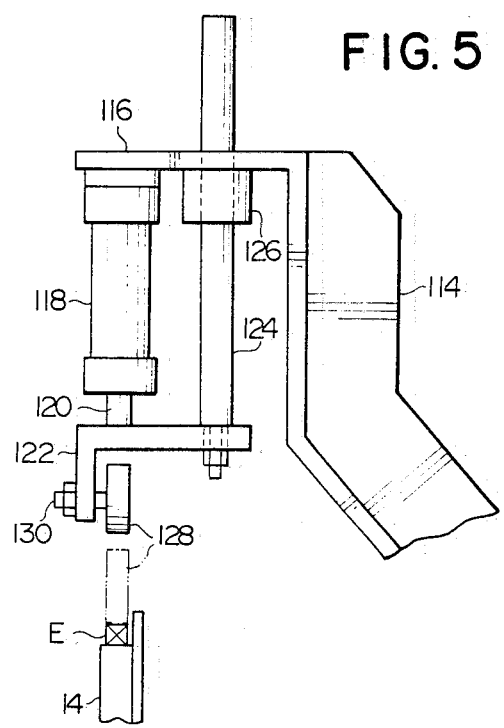
FIG. 5 is a sectional view showing the apparatus of FIGS. 1 and 2 as viewed from a vertical plane indicated by line V—V in FIG. 1.

Prior to each cycle of operation, furthermore, the d.c. motor 22 for the bead forming drum 14 is maintained de-energized so that the bead forming drum 14 is held at rest. The pneumatic power cylinder 56 associated with the rack member 54 (FIG. 3) is maintained in a condition having the piston rod 60 extended upwardly so that the rack member 54 is held in mesh with the pinion gear 54 in the neighborhood of the lower end of the rack member 54. The fluid-operated power cylinder 94 forming part of the cutting means (FIG. 4) is likewise maintained in a condition having the piston rod 96 extended downwardly so that the upper cutting blade 98 and the pressing member 106 connected thereto are positioned above the path of the bead forming element E between the bead forming drum 14 the second auxiliary feed roller 66. The fluid-operated power cylinder 118 forming part of the second pressing means shown in FIG. 5 is also maintained in a condition having the piston rod 120 extended downwardly so that the pressing roller 128 mounted on the roller carrier 122 is positioned above the bead forming drum 14.

At the beginning of each cycle of operation, the pneumatic power cylinder 56 (FIG. 3) is actuated to drive the rack member 54 to move downwardly a predetermined distance with respect to the movable support member 30. The downward movement of the rack member 54 is converted into rotation of the pinion gear 52 on the drive shaft 48 and causes the main feed roller 46 to turn in the direction of the arrow a in FIG. 1 about the center axis of the drive shaft 48. The bead forming element E is thus caused to travel arcuately on the feed roller 46 and then on the first auxiliary feed roller 64 and is given a curling or coiling tendency by the auxiliary feed roller 64. The pneumatic power cylinder 56 is operative to drive the rack member 54 for downward movement until the leading end of the bead forming element E thus caused to endwise travel by the main feed roller 46 reaches the upper end of the bead forming drum 14. Thus, the distance which the rack member 54 is to be driven to move by the power cylinder 56 is such that the bead forming element E is caused to travel a distance equal to the previously mentioned distance d between the vertical plane containing the axis of rotation of the bead forming drum 14 and the vertical at which the bead forming element E is to be cut on the path of the bead forming element E between the feed roller 66 and the bead forming drum 14. The bead forming element E which has reached the bead forming drum 14 in this manner is retained at its leading end to the peripheral surface of the bead forming drum 14 by the second retaining means. The d.c. motor 22 is then actuated to drive the bead forming drum 14 for rotation about the center axis of the drum shaft 16 until the bead forming element E is wound a predetermined number of turns on the peripheral surface of the bead forming drum 14. After the bead forming element E is thus wound on the bead forming drum 14 by the predetermined number of turns, the d.c. motor 22 is brought to a stop and the fluid-operated power cylinder 94 forming part of the cutting means (FIG. 4) is actuated to cause the piston rod 96 to extend downwardly from the cylinder body. It therefore follows that the upper cutting blade 98 carried on the piston rod 96 is caused to move downwardly to cut the bead forming element E between the upper and lower cutting blades 98 and 100. While the bead forming element E is being cut by the cutting blades 98 and 100, the pressing member 106 is brought into pressing contact with the bead forming element E in proximity to the cut end of the bead forming element E extending through the aperture 104 in the support plate 90 and elastically presses the bead forming element E against the lower cutting blade 100. The fluid-operated power cylinder 118 forming part of the second pressing means (FIG. 5) is actuated to cause the piston rod 120 to extend downwardly from the cylinder body so that the pressing roller 130 is brought into pressing contact with the outer peripheral surface of the outermost layer of the cut segment of the bead forming element E wound on the bead forming drum 14. The d.c. motor 22 is for a second time actuated to drive the bead forming drum 14 to make an approximately full turn about the center axis of the drum shaft 16 with the pressing roller 128 held in rolling and pressing contact with the outermost layer of the cut segment of the bead forming element E. A trailing end portion of the cut segment of the bead forming element E is in this fashion forced to adhere to the adjacent layer of the segment by means of the pressing roller 128. A wire bead consisting of a predetermined number of helical layers is now formed on the bead forming drum 14. The power cylinder 94 is then operated to cause its piston rod 96 to retract upwardly so that the bead forming element E to be processed in the subsequent cycle of operation is allowed to disengage from the pressing member 106. The leading end portion of the bead forming element E thus disengaged from the pressing member 106 is maintained on the path of the bead forming element E between the second auxiliary feed roller 66 and the bead forming drum 14 by means of the aperture 104 in the support plate 90.

From the foregoing description it will have been appreciated that a bead forming apparatus according to the present invention has the following major advantages.

(1) The bead forming apparatus as a whole has simple and compact construction in the absence of any movable pinch-off means to grip the bead forming element E at the leading end of the element and move the bead forming element E from the feed roller to the bead forming drum 14.

(2) In the absence of such pinch-off means, the bead forming element E is not contaminated with the lubricant which must otherwise be applied to the pinch-off means.

(3) The bead forming element E to be wound on the bead forming drum 14 is given a curling or coiling tendency by means of the feed roller 64 so that the trailing end portion of the cut segment of the bead forming element E wound on the bead forming drum 14 tends to curve along the second outermost layer of the segment and can thus be pressed onto the layer without being recoiled outwardly.

(4) Since the bead forming element E to be processed in each cycle of operation has its leading end portion retained in position simply by the aperture 104 formed in the support plate 90, no such extra retaining means as an adhesive tape or an adhesive compound need be applied to the bead forming element E.

What is claimed is:

1. A bead forming apparatus for forming a looped wire bead from a continuous line of bead forming element, comprising
   (1) support means including a stationary support means;
   a generally cylindrical, variable-diameter bead forming drum rotatable about an axis fixed with respect to the stationary support member;
   (2) transfer means operative to drive the bead forming element toward the bead forming drum along a predetermined path and to impart a coiling tendency to the bead forming element to be passed from the transfer means toward the bead forming drum;
   (3) cutting means for cutting the bead forming element at a predetermined location on said path;
   (4) first retaining means for retaining the leasding end of the bead forming element extending from said transfer means at said predetermined location; and
   (5) second retaining means for retaining the leading end of a cut segment of the bead forming element on the peripheral surface of said bead forming drum;
   said transfer means comprising a main feed roller rotatable about an axis parallel with the axis of rotation of the bead forming drum and at least one auxiliary feed roller which is rotatable about an axis parallel with the axis of rotation of the bead forming drum and which is located posterior to the main feed roller and anterior to the bead forming drum, the auxiliary feed roller being adapted to impart a coiling tendency to the bead forming element to the pressed from the main feed roller toward the bead forming drum, said support means further comprising a movable support member which is movable with respect to said stationary support member, said main feed roller and said auxiliary feed roller being rotatably mounted on said movable support member so that said predetermined path of the bead forming element is variable with respect to said bead forming drum, said main feed roller having a center axis which is fixed with respect to said movable support member and in which said transfer means further comprises at least one support plate pivotally movable with respect to said movable support member about an axis aligned with the center axis of said main feed roller, the axis of rotation of said auxiliary feed roller being fixed with respect to said support plate and being movable with the support plate with respect to said movable support member.

2. A bead forming apparatus as set forth in claim 1, in which said main feed roller and said auxilliary feed roller have the center points of their respective center axes located on a plane on which the center point of the center axis of the bead forming drum is located.

3. A bead forming apparatus as set forth in claim 1, in which the center axis of said main feed roller is fixed with respect to said movable support member and in which said transfer means further comprises at least one support plate pivotally movable with respect to said movable support member about an axis aligned with the center axis of said main feed roller, the axis of rotation of said first auxiliary feed roller being fixed with respect to said support plate and being movable with the support plate with respect to said movable support member.

4. A bead forming apparatus as set forth in claim 3, in which said support plate is formed with a slot curved with respect to said first auxiliary feed roller, a second auxiliary feed roller being disengageably mounted on said support plate through said slot and being movable with respect to the support plate along said slot.

5. A bead forming apparatus as set forth in claim 1, in which said transfer means further comprises drive means to drive said main feed roller for rotation about the axis of rotation thereof, the drive means comprising a pinion gear rotatable with the main feed roller about the axis of rotation of the main feed roller and a rack member held in mesh with the pinion gear and longitudinally movable in opposite directions with respect to said movable support member. members and an internally threaded member fast on the other of the stationary and movable members, said elongated threaded member being engaged by said internally threaded member and being longitudinally movable through the internally threaded member when driven for rotation about the center axis thereof.

6. A bead forming apparatus as set forth in claim 1 in which said transfer means further comprises drive means to drive said support plate to pivotally move with respect to said movable support member about the axis of rotation of said main feed roller, said drive means comprising a first gear member pivotally movable with said support plate about the axis of rotation of said support plate, a second gear member which is in mesh with the first gear member and which is rotatable about an axis fixed with respect to said movable support member, and means adapted to manually drive the second gear member for rotation about the axis of rotation thereof.

7. A bead forming apparatus as set forth in claim 6 in which said first gear member is constituted by a worm gear which is coaxial with a shaft extending perpendicular to said support plate and said second gear member is constituted by a worm having its axis of rotation directed perpendicularly in non-intersecting relationship to the axis of rotation of said shaft.

8. A bead forming apparatus as set forth in claim 1, in which said cutting means comprises a first cutting blade movable with respect to said movable support member through said predetermined path of the bead forming element, a second cutting blade fixed with respect to said movable support member and having a knife edge located on said predetermined path of the bead forming element, and drive means to drive said first cutting blade for movement into and out a predetermined position to engage the second cutting blade.

9. A bead forming apparatus as set forth in claim 8, further comprising pressing means adapted to press the bead forming element against said second cutting blade at the leading end of the bead forming element extending on said predetermined path of the bead forming element, said pressing means comprising a pressing member movable with said first cutting blade toward and away from a position to engage the lower cutting blade.

10. A bead forming apparatus as set forth in claim 9, in which said pressing means further comprises biasing means urging said pressing member toward said second cutting blade.

11. A bead forming apparatus as set forth in claim 9, in which said first retaining means and said pressing means are disposed adjacent to the path of travel of the bead forming element and adjacent to said bead forming drum with said pressing means being disposed upstream of said first retaining means.

* * * * *